United States Patent [19]
Hiraka

[11] Patent Number: 5,987,573
[45] Date of Patent: Nov. 16, 1999

[54] MEMORY APPARATUS AND MEMORY CONTROL METHOD

[75] Inventor: Seiji Hiraka, Mizusawa, Japan

[73] Assignee: Tokyo Electron Limited, Tokyo, Japan

[21] Appl. No.: 08/796,751

[22] Filed: Feb. 6, 1997

[30] Foreign Application Priority Data

Feb. 6, 1996 [JP] Japan .................................. 8-042170

[51] Int. Cl.⁶ .................................................. G06F 12/00
[52] U.S. Cl. ..................... 711/156; 711/205; 395/800.34; 395/555
[58] Field of Search ..................... 711/156, 205; 395/800.34, 555; 365/185.33, 185.21

[56] References Cited

U.S. PATENT DOCUMENTS

| | | | |
|---|---|---|---|
| 4,314,333 | 2/1982 | Shibayama et al. | 395/800.34 |
| 5,524,230 | 6/1996 | Sakaue et al. | 1/1 |
| 5,581,503 | 12/1996 | Matsubara et al. | 365/185.33 |
| 5,611,607 | 3/1997 | Okamoto et al. | 711/103 |
| 5,627,783 | 5/1997 | Miyauchi | 365/185.33 |
| 5,678,098 | 10/1997 | Ishihara et al. | 396/233 |
| 5,708,603 | 1/1998 | Tanaka | 365/185.21 |
| 5,729,720 | 3/1998 | Kau et al. | 395/555 |

Primary Examiner—John W. Cabeca
Assistant Examiner—Mehdi Namazi
Attorney, Agent, or Firm—Oblon, Spivak, McClelland, Maier & Neustadt

[57] ABSTRACT

An empty block table is constructed by 64 words×8 bits and has 512 memory positions 000H(A0) to IFFH(A511) one-to-one corresponding to 512 blocks BL0 to BL511 within a flash memory FMi. Empty data [a] of 1 bit is stored to each memory position (Aj). This empty data has value "1" when a block BLj corresponding to this memory position (Aj) is in an empty state at present. The empty data also has value "0" when no block BLj corresponding to this memory position (Aj) is in the empty state at present (when data are included in this block).

14 Claims, 12 Drawing Sheets

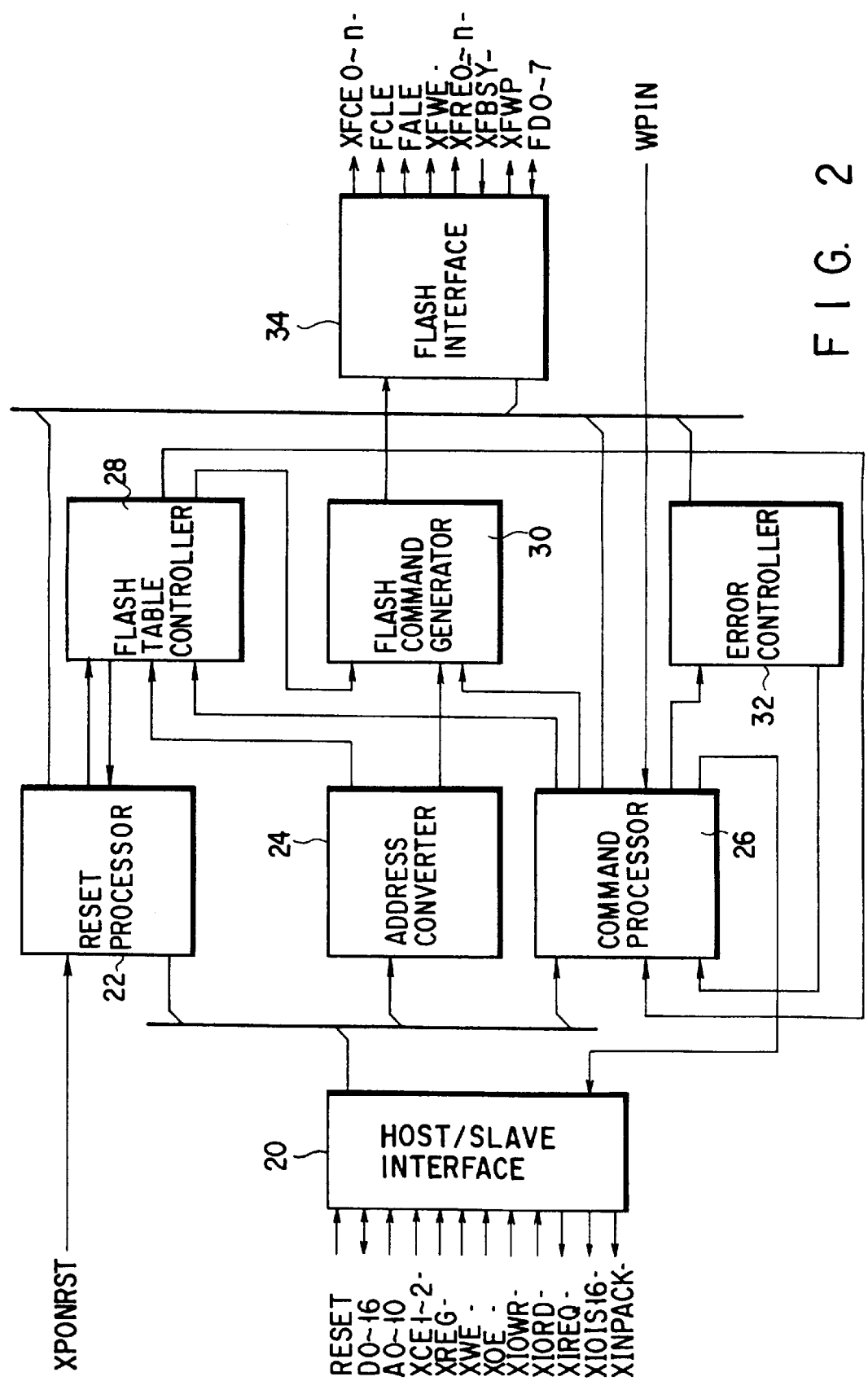
F I G. 2

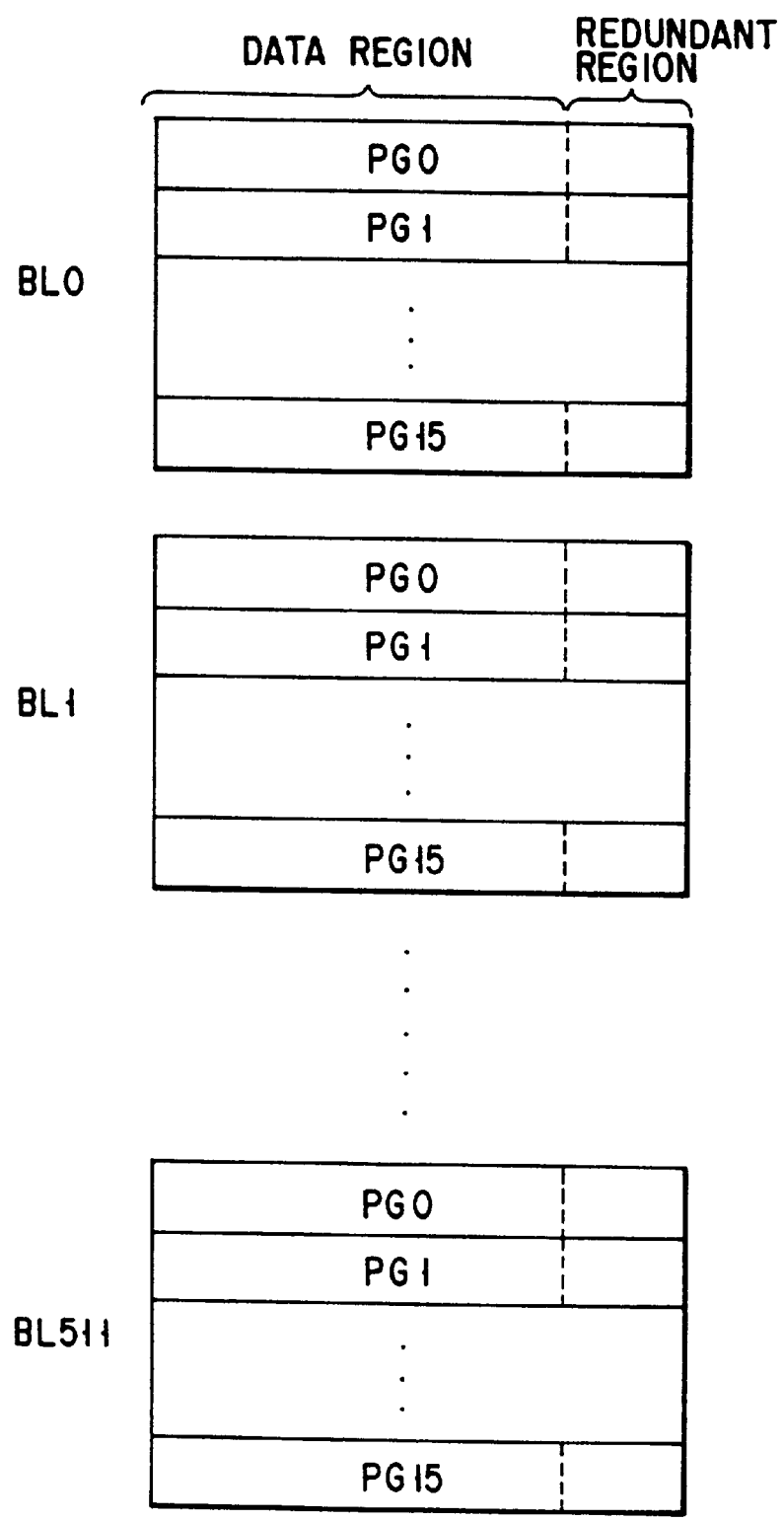
F I G. 3

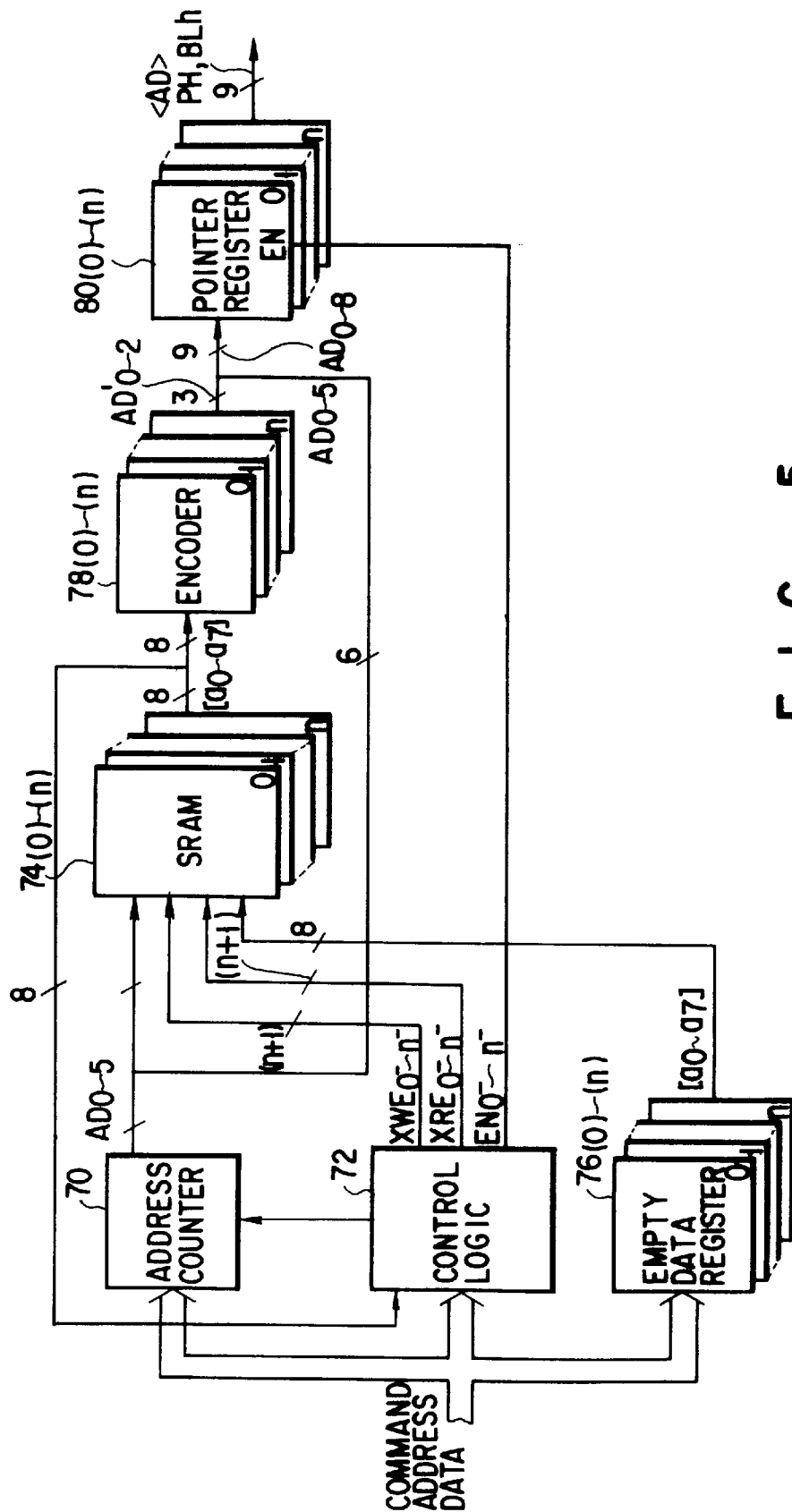
F I G. 5

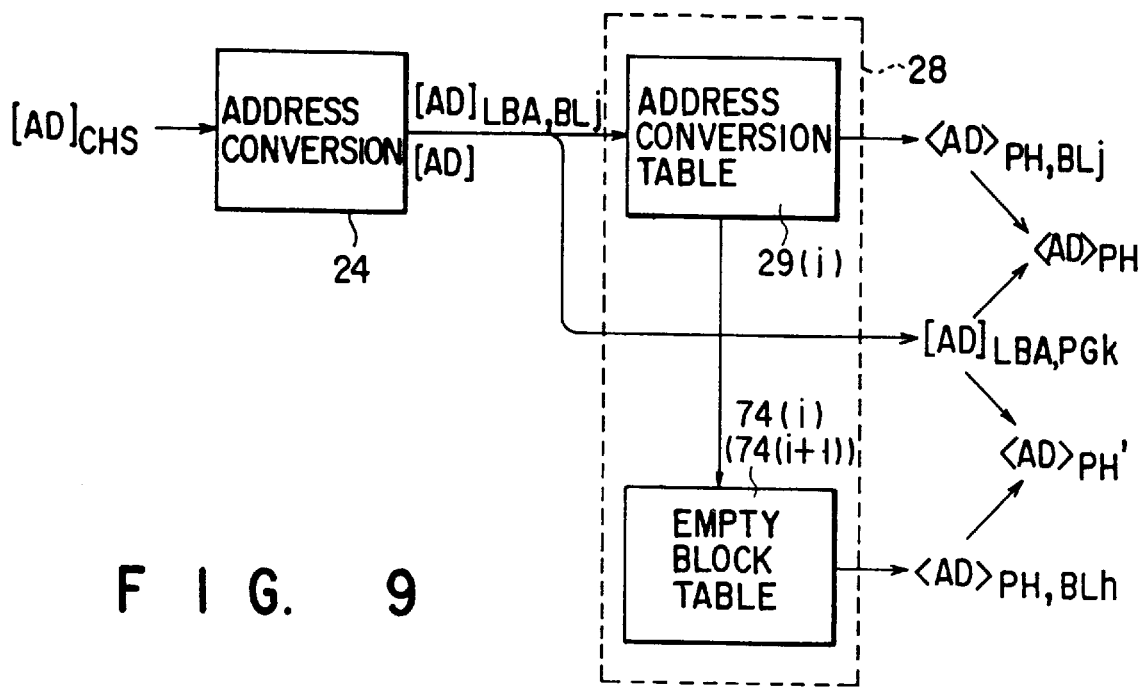
F I G. 9
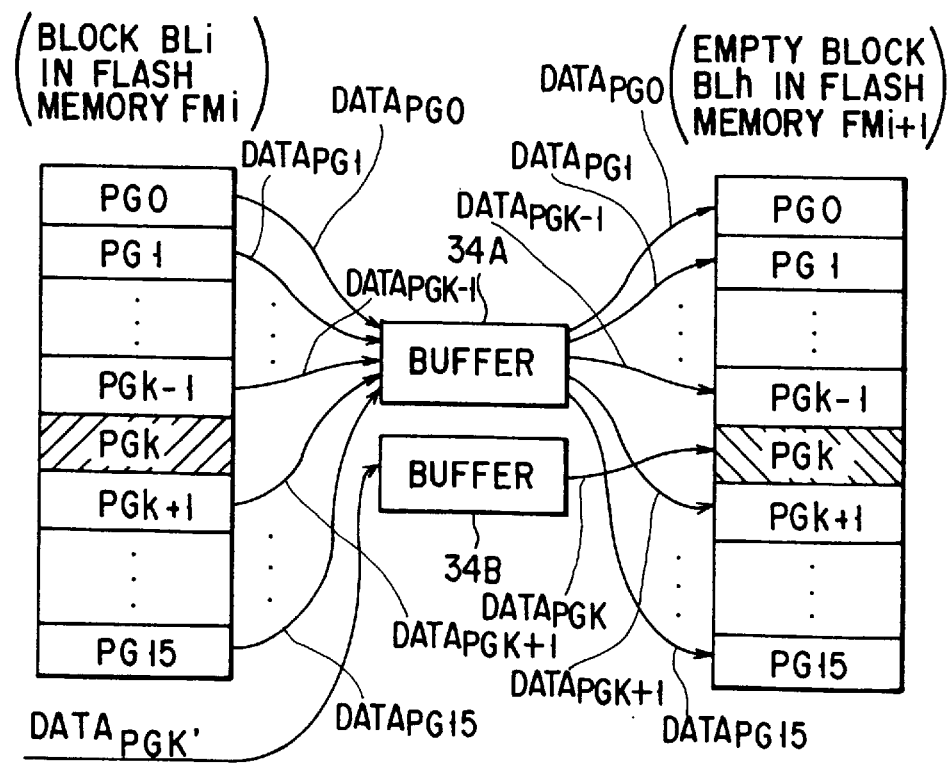
F I G. 10

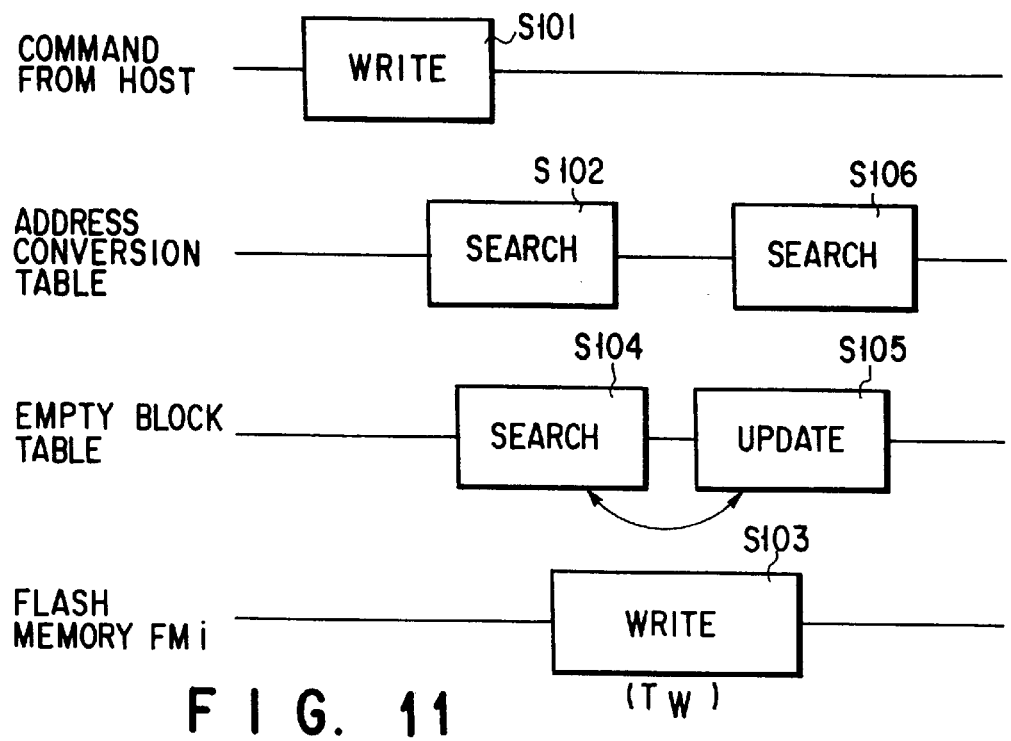
F I G. 11
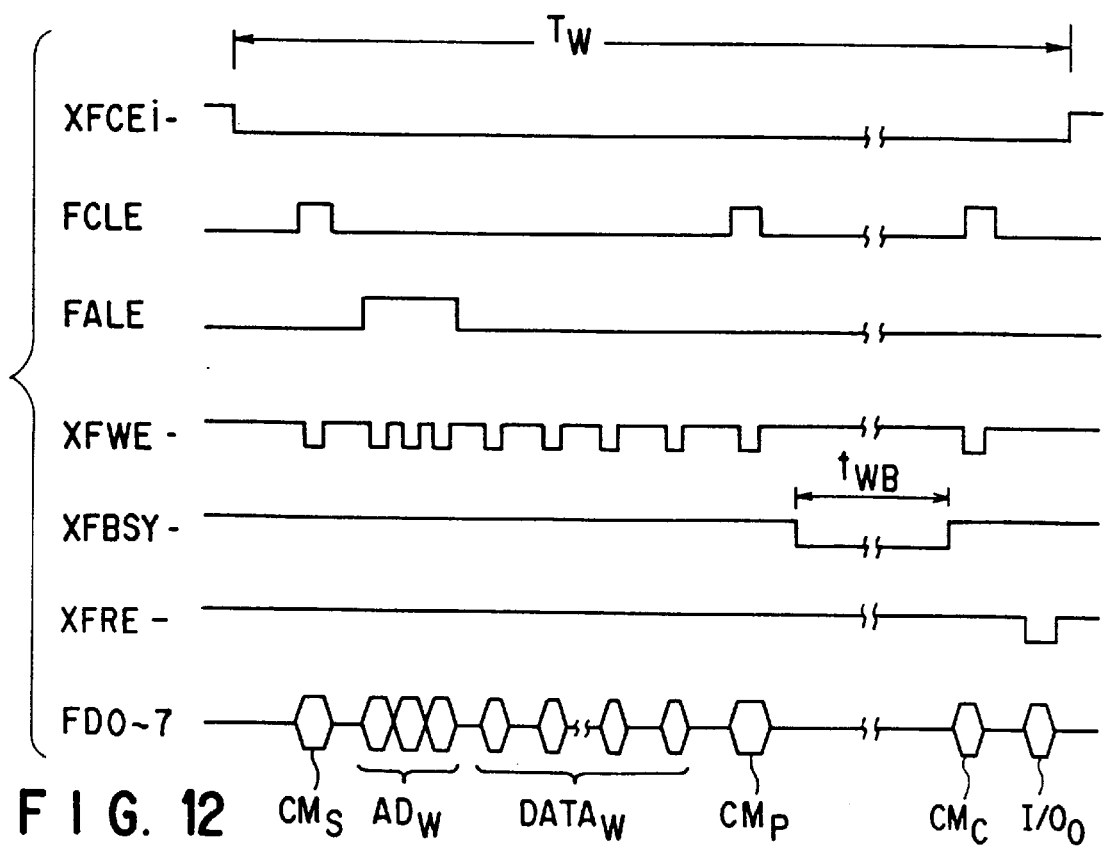
F I G. 12

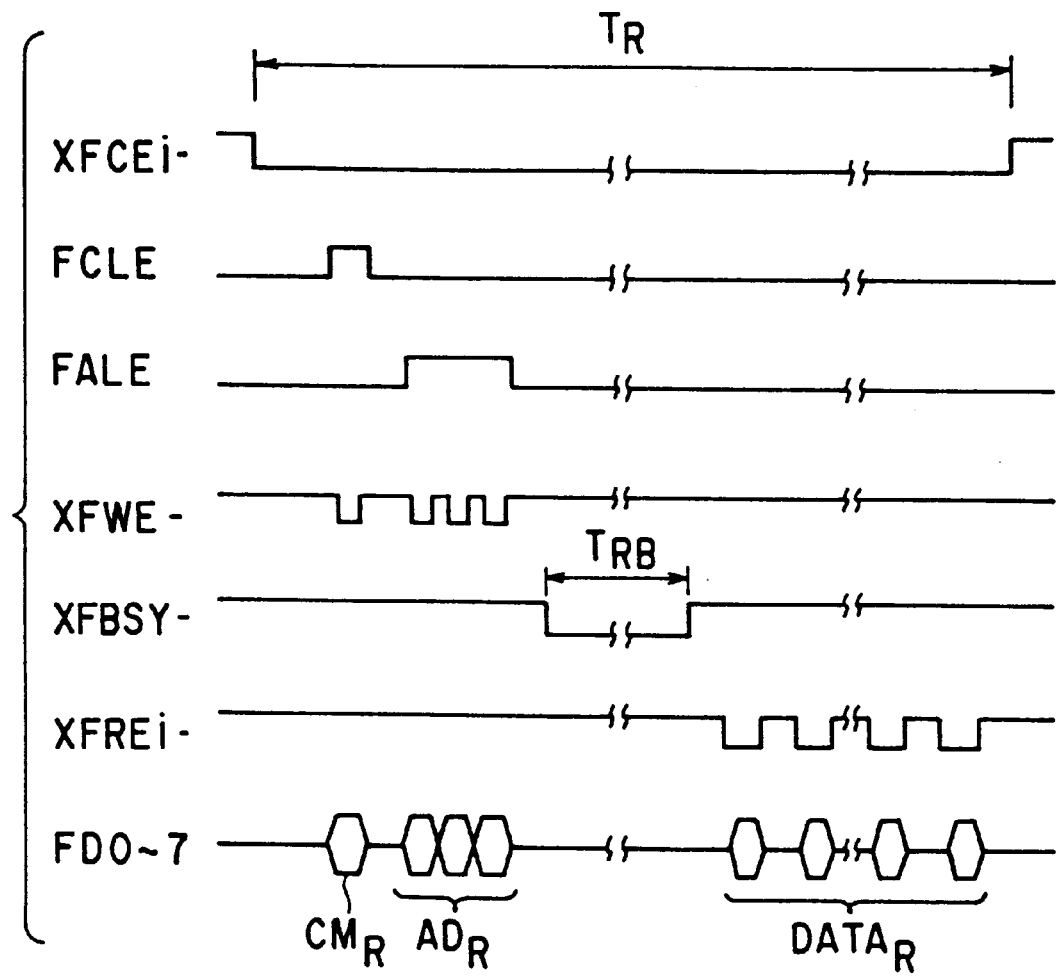
F I G. 14

MEMORY APPARATUS AND MEMORY CONTROL METHOD

BACKGROUND OF THE INVENTION

The present invention relates to a memory apparatus including a semiconductor memory constructed such that memory data are batch-erased in a block unit.

Recently, a flash memory (flash EEPROM) has been noticed as a semiconductor memory for replacement of with a magnetic memory such as a hard disk, a floppy disk, etc. The flash memory is a nonvolatile semiconductor memory in which power consumption is small and data can be electrically rewritten. Further, the flash memory is light in weight and is compact and has a preferable earthquake proof property. Accordingly, usage of the flash memory to a portable device, etc. is enlarged.

For example, a memory array within a chip of the flash memory is divided into plural memory blocks such as 512 memory blocks. Each block is divided into plural pages such as 16 pages or sectors. Normally, programming (write-in) and reading-out are performed in a page unit and an erasing operation is performed in a block unit.

In general, a dedicated controller for only the flash memory is used in a computer system using the flash memory in an external memory unit. A host computer (e.g., a personal computer) gives writing and reading commands to this controller. The controller directly controls writing and reading operations of data with respect to the flash memory by receiving the commands from the host computer. Further, the controller performs a memory managing operation such as data rewriting every block and the batch erasure, etc.

When such a memory administration operation is performed, the controller must be able to know blocks (in use) including memory data and blocks (empty blocks in an empty state) including no memory data within each flash memory at any time. Therefore, an address conversion table for registering blocks used at present and an empty block table for registering empty blocks in an empty state at present are formed within a RAM (generally SRAM) separately arranged from the flash memory. The controller refers to or searches for these tables every time writing commands are transmitted from the host computer.

When a memory region within the flash memory is divided into 512 blocks as mentioned above in the empty block table in the conventional flash memory system, 512 address data storing positions (address data storing positions) are formed in this empty block table. Address data of 9 bits for designating a memory position (physical address) of one empty block in an empty state within this flash memory is stored every address data storing position.

An empty block registered in this table to be used most early is designated by a read pointer. The controller refers to the read pointer when an empty block is required to write new data, etc. Thus, since the read pointer designates an address data storing position, the controller reads address data stored to this address data storing position and gets access to the empty block by this read address data.

When the address data is thus read out of the address data storing position, the read pointer increments a pointer value by one and designates the next address data storing position. Data (address data) in address data storing positions undesignated by the read pointer may be erased immediately after the address data have been read. Otherwise, these data (address data) may be held until the next new data (address data) are stored (registered).

The controller refers to a write pointer when the used block is changed to an empty block in an empty state by the batch erasure. Thereafter, the write pointer increments a pointer value by one and designates the next address data storing position.

The conventional empty block table mentioned above requires a memory capacity (512×9 bits) obtained by multiplying the total number (512 in the above example) of address data storing positions K by a bit number (9 bits in the above example) of block address data with respect to one flash memory. The number of address data storing positions equal to the total block number (512) is set within this table since all the blocks can simultaneously attain empty states in a certain case.

In the actual flash memory system, many (e.g., 10) flash memories are connected to the same bus and one controller generally controls operations of these flash memories. The number of empty block tables corresponding to the total number of flash memories is set within a table memory (SRAM).

In the conventional system, the memory capacity (512×9 bits per one table) of the above-mentioned empty block tables is large so that a large-scale expensive table memory (SRAM) is required. Accordingly, it is difficult to construct the controller and the table memory (SRAM) by one chip, which becomes one factor limiting a table managing function and system performance.

BRIEF SUMMARY OF THE INVENTION

An object of the present invention is to provide a memory system for improving performance thereof and making this system compact by reducing the size or scale of an empty block table for registering empty blocks in an empty state including no data within a semiconductor memory constructed such that memory data are batch-erased in units of a block.

According to the invention, there is provided a memory apparatus comprising: a semiconductor memory having a memory area divided in a plurality of blocks in which data are selectively stored and batch-erasing data in units of a block; a control section having a table memory which has a plurality of memory positions corresponding to the blocks of the semiconductor memory, respectively, and stores data indicating absence of data in a memory position thereof which corresponds to one of the blocks in which no data is stored.

According to the invention, there is provided a memory control method comprising: providing a plurality of memory positions in a table memory, the memory positions corresponding to a plurality of blocks obtained by dividing a memory area of a semiconductor memory batch-erasing data in units of a block; storing empty data indicating absence of data in at least one of the memory positions of the table memory which corresponds to at least one of the blocks which contains no data; and detecting at least one empty block by searching the table memory for the empty data in a data writing mode.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 2 is a block diagram showing the internal functional construction of a controller in the embodiment of FIG. 1.

FIG. 3 is a view showing the format of a memory area within a flash memory.

FIG. 5 is a block diagram showing the construction of an empty block table administrating section in the above embodiment.

FIG. 9 is a block diagram showing the constructions of address converting and table searching portions in the above embodiment.

FIG. 10 is a view for explaining a data transfer operation and a data writing operation for rewriting data in the above embodiment.

FIG. 11 is a view for explaining a flow of a series of operations of respective portions within the flash disk system with respect to a new writing access from a host computer in the above embodiment.

FIG. 12 is a timing chart showing an operation performed when the controller writes data to a certain flash memory in the above embodiment.

FIG. 14 is a timing chart showing an operation performed when the controller reads data from a certain flash memory in the above embodiment.

DETAILED DESCRIPTION OF THE INVENTION

The embodiments of the present invention will next be described with reference to FIGS. 1 to 14.

Figure 1:
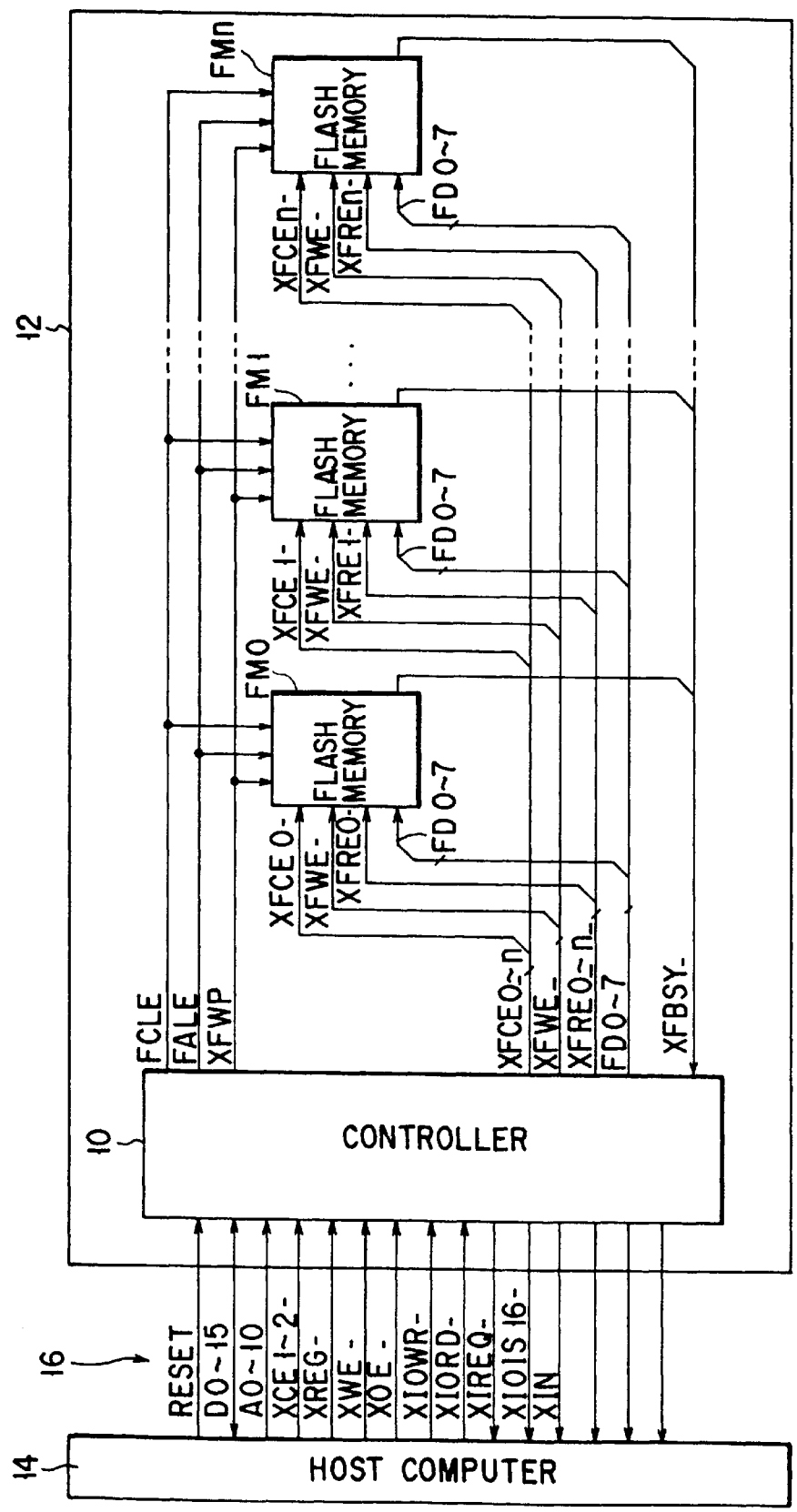
FIG. 1 is a block diagram of a flash disk system in one embodiment of the present invention.

FIG. 1 shows the construction of a flash disk system in accordance with one embodiment of the present invention. In this system, one controller 10 and each of chips of plural (n+1) NAND type flash memories FM0 to FMn are mounted onto one card (flash disk card) 12. The card 12 is mounted to a card slot of a host computer 14. The controller 10 is connected to the host computer 14 by an interface of a predetermined standard such as a PCMCIA-ATA or IDE interface 16. The flash memories FM0 to FMn are constructed by memory chips having the same construction and function.

For example, the controller 10 on the card 12 is connected to each of the flash memories FM0 to FMn through internal buses FD0 to FD7 of an 8-bit width, respective single control lines (FCLE, FALE) XFWP, XFWE-, XFRE- and XFBSY- common to all the flash memories FM0 to FMn, and (n+1) individual control lines XFCE0- to XFCEn- equal to the flash memories FM0 to FMn in total number.

The internal buses FD0 to FD7 are commonly used to transfer commands, addresses and data between the controller 10 and the respective flash memories FM0 to FMn. FCLE in the above common control lines is a command latch enable control line for discriminating a command code on the buses FD0 to FD7 as commands by the flash memories FM0 to FMn. FALE is an address latch enable control line for discriminating an address code on the buses FD0 to FD7 as an address by the flash memories FM0 to FMn. XFWP is a write protect control line for compulsorily inhibiting writing of data to the flash memories FM0 to FMn. XFWE- is a write enable control line for inputting a code or data on the buses FD0 to FD7 to the respective flash memories FM0 to FMn. XFRE- is a read (output) enable control line for outputting read data from output ports of the respective flash memories FM0 to FMn onto the buses FD0 to FD7. XFBSY- is a busy line for informing the controller 10 of a busy state of each of the flash memories FM0 to FMn.

The above individual control lines XFCE0- to XFCEn- are chip enable control lines for individually or independently setting each of the flash memories FM0 to FMn to a chip enable state (operable state).

FIG. 2 shows an internal functional construction of the controller 10. The controller 10 has a host/slave interface 20, a reset processor 22, an address converter 24, a command processor 26, a flash table controller 28, a flash command generator 30, an error controller 32 and a flash interface 34.

Various kinds of registers capable of directly writing/reading data from the host computer 14 are built in the host/slave interface 20. The host/slave interface 20 is connected to a bus of the host computer 14 by an interface of a predetermined standard such as a PCMCIA-ATA or IDE interface.

In this host interface, address signals A0 to A10 and control signals XCE1- to XCE2- are used to select the respective registers within the host/slave interface 20 from the host computer 14. XREG- is used to select a memory space of an address map and an I/O space. A control signal XWE-/XOE- is used to write/read the memory space. A control line XIOWR-/XIORD- is used to write/read the I/O space. An interruption request signal XIREQ- and an input acknowledge signal INPACK-, etc. are transmitted from the host/slave interface 20 to the host computer 14. The host/slave interface 20 includes a circuit for decoding commands from the host computer 14.

The reset processor 22 performs processing for resetting the operations of respective circuit elements within the controller 10 in response to a reset signal, e.g., XPONRST from the exterior of the reset processor 22. Further, the reset processor 22 controls initializing processing after a reset release.

The address converter 24 converts a logical address in a CHS (cylinder head sector) mode designated by the host computer 14 to a logical address in an LBA (logical block address) mode within a flash disk.

The command processor 26 controls the operations of respective circuit elements within the controller 10 to execute commands from the host computer 14 decoded by the host/slave interface 20.

The flash table controller 28 initializes an address conversion table and an empty block table by a request from the reset processor 22, the command processor 26, etc. The flash table controller 28 also searches and updates the tables in response to commands from the host computer 14. A table memory constructed by a SRAM is arranged in the flash table controller 28. The address conversion table and the empty block table in this embodiment are constructed in this table memory.

The flash command generator 30 generates a command code and an address signal with respect to the flash memories FM0 to FMn by a request from the flash table controller 28, the command processor 26, etc.

The error controller 32 executes ECC (Error Checking and Correction) processing at data writing and reading times.

The flash interface 34 is an input/output port for transmitting data and signals between this flash interface 34 and the flash memories FM0 to FMn through the above common buses FD0 to FD7 and the various kinds of control lines (FCLE, FALE, etc.). The flash interface 34 has a timing control function for multiplexing commands, addresses and data in different timings on the common buses FD0 to FD7.

FIG. 3 shows the format of a memory area within each flash memory FMi (i=0 to n). For example, an entire memory area of each flash memory FMi are divided into plural blocks such as 512 blocks BL0 to BL511. For example, each block BLj (j=0 to 511) is divided into plural pages or sectors such as 16 pages or sectors PG0 to PG15. Normally, programming (writing) and a reading operation are performed in a page unit and an erasing operation is performed in units of a block.

Each page PGk (k=0 to 15) is constructed by a data area of a predetermined capacity such as 512 bytes and a redundant region of a predetermined capacity such as 16 bytes. The data area is an original data storage region. The redundant region is divided into some fields. Redundant data such as a "conversion table address" showing a logical block address allocated by a predetermined data amount (byte number) to the block BLj at present, a "block status" showing a good or bad quality of this block BLj, etc. are stored to each of the fields. When this block BLj is an empty block having no data at present, no data of the "conversion table address" are included in the redundant data.

Figure 4:
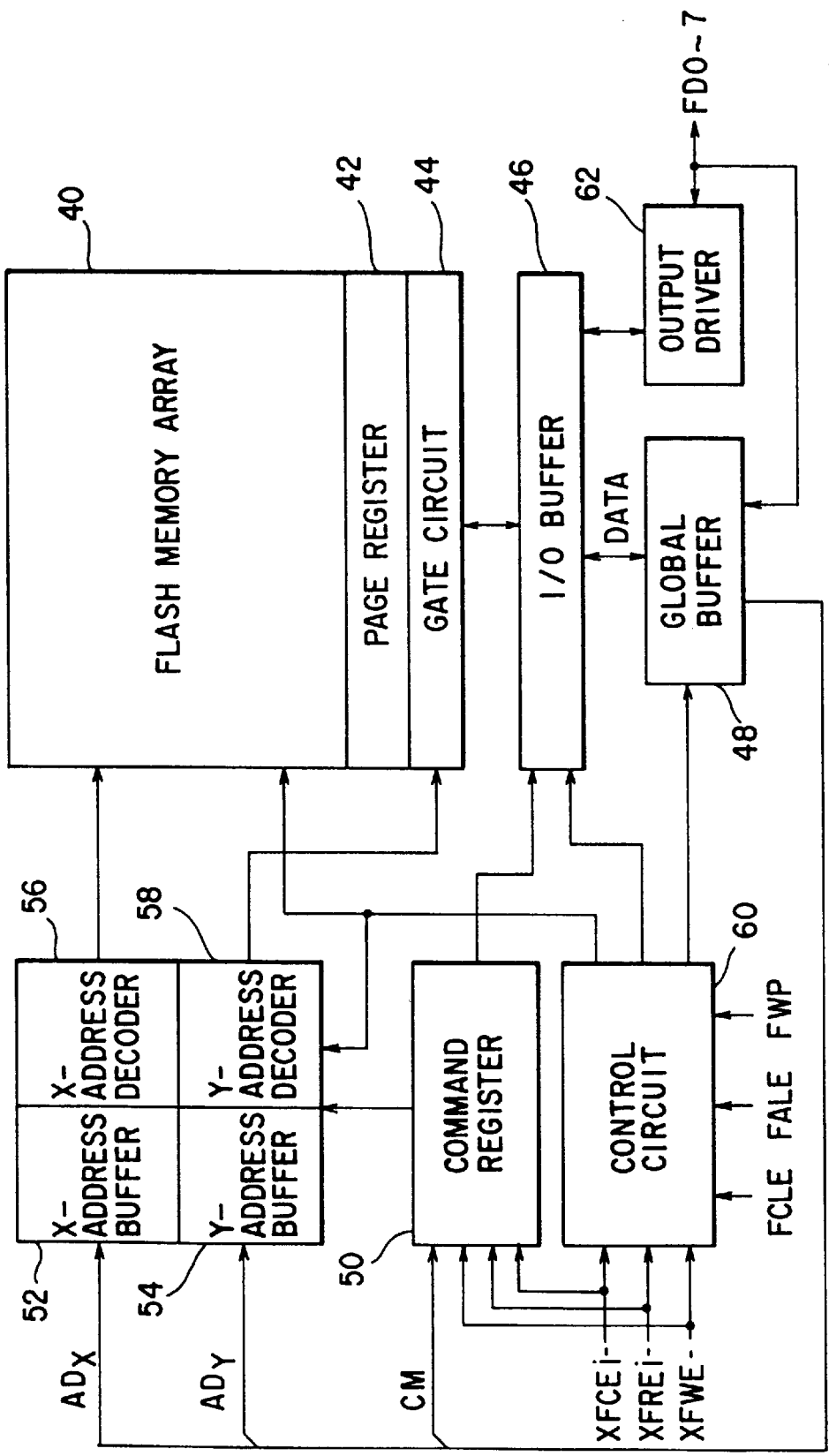
FIG. 4 is a view showing an internal construction of the flash memory in the above embodiment.

FIG. 4 shows an example of an internal construction of each flash memory FMi. A flash memory array 40 is constructed by many memory cells arranged in a matrix form. For example, as shown in FIG. 3, when the flash memory FMi of one chip has 512 blocks BL0 to BL511 and each block BLj is constructed by 16 pages or pages PG0 to PG15 and each page PGk is constructed by the data area of 512 bytes and the redundant region of 16 bytes, the memory array 40 is constructed by memory cells of 8192 (16×512) rows and 528 (512+16) columns and has a memory capacity of 4 megabytes.

The flash memory array 40 is electrically connected to an I/O buffer 46 having an accumulating capacity on one page (528 bytes) through a page register 42 and a gate circuit 44. Data are transferred in parallel in units of a page between the memory array 40 and the I/O buffer 46. The I/O buffer 46 constitutes a substantial output port in this flash memory FMi.

Commands, addresses and data on the buses FD0 to FD7 are respectively latched to a command register 50, X, Y address buffers 52, 54 and the I/O buffer 46 through the global buffer 48.

The command register 50 decodes inputted commands and controls operations of the address buffers 52, 54, address decoders 56, 58 and the I/O buffer 46. This command register 50 includes a status register for holding status data showing a memory state.

A row address ADX is inputted to the X-address buffer 52 and the X-address decoder 56 decodes this row address ADX and makes active a row (page) designated (selected) within the memory array 40. A column address ADY is inputted to the Y-address buffer 54 and the Y-address decoder 58 decodes this column address ADY and controls an operation of the gate circuit 44 such that data in a column designated (selected) within the memory array 40 are transferred.

Control signals FCLE, FALE, FWP, XFCEi-, XFWE- and XFRE- are inputted from the controller 10 to a control circuit 60. The control circuit 60 controls the operations of respective portions within the memory in response to the respective control signals. An output driver 62 operates a bus line when read data set in the I/O buffer 46 are transmitted to the buses FD0 to FD7.

FIG. 5 shows the construction of an empty block table administrating section in this embodiment. This empty block table administrating section is included in the flash table controller 28 of the controller 10.

As shown in FIG. 5, this empty block table administrating section is constructed by one address counter 70 and a control logic 72 common to all the flash memories FM0 to FMn, and (n+1) parallel SRAMs or SRAM memory regions 74(0) to 74(n), empty data registers 76(0) to 76(n), encoders 78(0) to 78(n) and pointer registers 80(0) to 80(n) corresponding to the respective flash memories FM0 to FMn.

In this embodiment, each SRAM 74($i$) has a memory capacity of 64×8 bits. An empty block table for registering a block in an empty state at present within a flash memory FMi corresponding to one memory region 74($i$) of this SRAM 74 is formed in this memory region.

When data (empty data) are written to each SRAM area 74($i$), writing address data AD0 to AD5 of 6 bits from the address counter 70, a writing control signal XWEi- in an active state (low voltage level) from the control logic 72, writing data of 8 bits from the data register 76($i$), i.e., empty data [a0 to a7] are provided to this SRAM area 74($i$) in predetermined timing.

When the data (empty data) are read out of each SRAM area 74($i$), reading address data AD0 to AD5 of 6 bits from the address counter 70 and a reading control signal XREi- in an active state (low voltage level) from the control logic 72 are provided to this SRAM area 74($i$) in predetermined timing. Eight empty data [a0 to a7] of 8 bits simultaneously read from this SRAM area 74($i$) are inputted to the encoder 78 ($l$) and are also provided to the control logic 72.

Each encoder 78($i$) converts the empty data [a0 to a7] of 8 bits from the SRAM 74($i$) corresponding to this encoder to binary address codes (low-order addresses) AD'0 to AD'2 of three bits in a predetermined conversion format described later. Each pointer register 80($i$) is constructed such that, when an enable control signal ENi- from the control logic 72 attains an active state (low voltage level), address data AD0 to AD8 of 9 bits obtained by synthesizing address data (high-order addresses) AD0 to AD5 of 6 bits from the address counter 70 and binary address codes (low-order addresses) AD'0 to AD'2 of 3 bits from the encoder 78($i$) are latched as a pointer <AD>PH, BLh.

Figure 6:
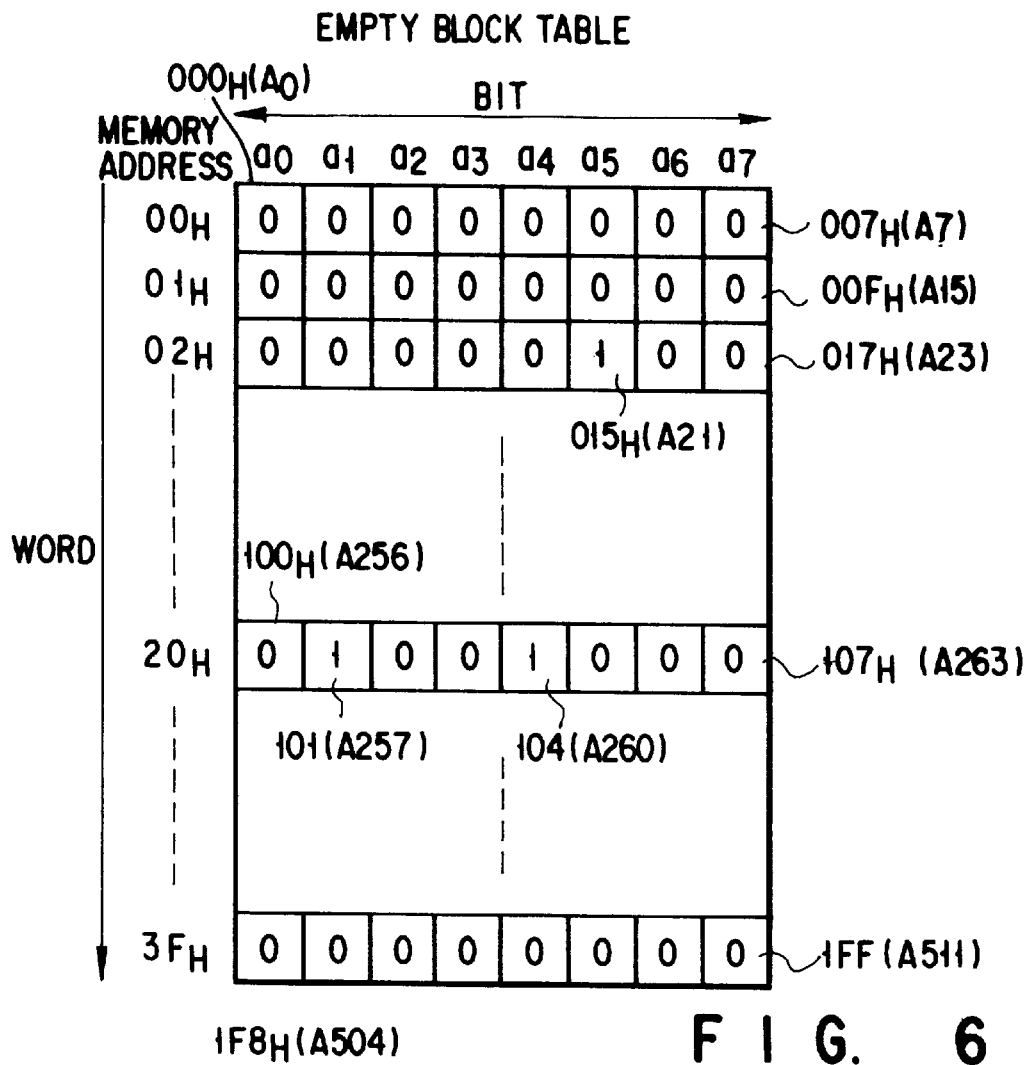
FIG. 6 is an arrangement view of an empty block table within the memory in the above embodiment.
Figure 7:
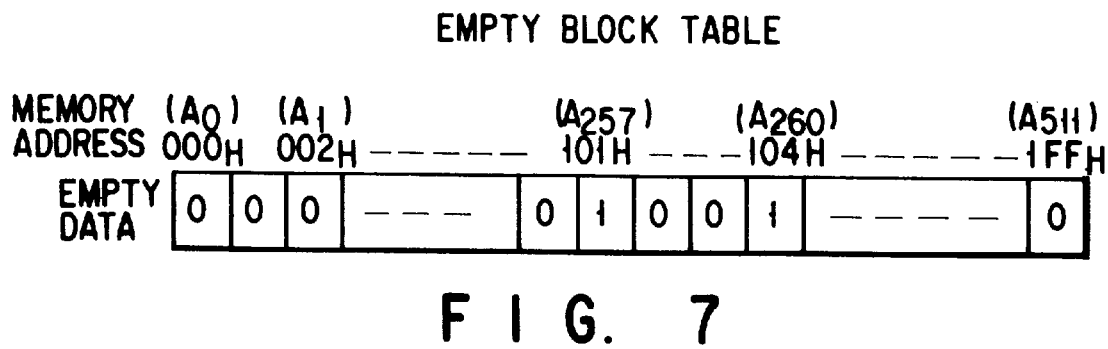
FIG. 7 is a development view of the empty block table in the above embodiment.

FIGS. 6 and 7 respectively show a memory arrangement view and a development view of an empty block table formed within the SRAM area 74($i$).

The empty block table in this embodiment is constructed by 64 words×8 bits and has 512 memory positions 000H (A0) to IFFH(A511) one-to-one corresponding to 512 blocks BL0 to BL511 within the flash memory FMi. Empty data [a] of one bit is stored to each memory position (Aj). This empty data [a] has a value of "1" when a block BLj corresponding to the memory position (Aj) is in an empty state at present. The empty data [a] has a value of "0" when this block BLj is not in the empty state (when data are included in this block).

In this empty block table, the empty data is written/read in a word (8 bits) unit [a0 to a7]. The address data (high-order addresses) AD0 to AD5 of 6 bits from the address counter 70 designate one of memory addresses (00H to 3FH) of 64 words.

In the encoder 78(i), the empty data [a0 to a7] of 1 word is converted to binary address codes (low-order addresses) AD'0 to AD'2 of 3 bits designating a smallest sequential order position showing a value "1" in an empty state within 1 word.

Accordingly, for example, in the example of FIG. 6, no empty data [00000000] of 1 word at memory address 00H includes the value "1" in an empty state so that the binary address codes AD'0 to AD'2 have no meaning. Empty data [00000100] of 1 word at memory address 02H is constructed such that the value "1" in an empty state is set in a sixth position. Therefore, the binary address codes AD'0 to AD'2 are set to [101]. Empty data [01001000] of 1 word at memory address 20H is constructed such that the value "1" in an empty state is set in second and fifth positions. In this case, the second position has priority so that the binary address codes AD'0 to AD'2 are set to [001].

This empty block table is initialized immediately after power is turned on or reset is released. The controller 10 reads data of the redundant region in each of the blocks BL0 to BL511 within the flash memories FM0 to FMn to initialize the empty block table, and checks whether or not data (logical block address) of a "conversion table address" are included in these data of the redundant region. Namely, if data are stored to this block BLj, the logical block address used in the previous writing is stored (saved) to the redundant region of this block BLj as a "conversion table address". However, if no data are stored to this block BLj, i.e., if an empty state is set, no data (logical block address) are stored to the redundant region of this block BLj at the "conversion table address". Accordingly, it is possible to judge on the basis of data of the redundant region whether each block BLj is an empty block or not at an initializing time.

This initializing processing is executed by the flash table controller 28, the flash command generator 30, the flash interface 34, etc. in the controller 10.

In FIG. 5, in the flash table controller 28, empty data a of 1 bit is sequentially loaded to an empty data register 76(i) for each flash memory FMi. This empty data a of 1 bit shows whether each of the blocks BL0 to BL511 is an empty block or not. When 8 (8 bits) empty data [a0 to a7] are accumulated to the empty data register 76(i), these eight empty data [a0 to a7], i.e., empty data of 1 word are written to a predetermined word memory address of the SRAM area 74(i).

As mentioned above, the empty data is stored to this SRAM area 74(i) or the empty block table under control of the control logic 72. Address data AD0 to AD5 for designating a word memory address as a writing destination are provided by the address counter 70.

When initialization (initial register) of each empty block table is terminated, the control logic 72 determines a pointer value for designating an empty block BLj to be used most early. Therefore, the control logic 72 reads the empty data [a0 to a7] of 1 word from a smallest number address (00H) of each SRAM area 74(i) (empty block table), and checks whether the value "1" in an empty state is included in the read word [a0 to a7] or not. If no value "1" in an empty state is included in the read word, empty data [a0 to a7] of 1 word at the next word memory address is read and the above checking operation is similarly repeated. In contrast to this, when the value "1" in an empty state is included in the read word, the checking operation is terminated at this time.

At this time, binary address data AD'0 to AD'2 of 3 bits showing a memory position at a smallest address within the word including the value "1" in this empty state are obtained as an output of the encoder 78(i). Accordingly, the control logic 72 sets an enable signal ENi- to be active (low voltage level). Thus, binary address data AD0 to AD8 of 9 bits are obtained by synthesizing binary address data AD0 to AD5 of 6 bits from the address counter 70 showing a memory address of this word and binary address data AD'0 to AD'2 of 3 bits from the encoder 78(i) showing a memory position at a smallest address having the value "1" in the empty state within this word, and are latched (loaded) to the pointer register 80(i) as a pointer <AD>PH, BLh.

For example, when registered data of the empty data at an initializing time in the empty block table within the SRAM area 74(i) corresponding to the flash memory FMi are provided as shown in FIG. 6, the pointer <AD>PH, BLh set to the pointer register 80(i) at the initializing time shows a memory position of 015H(A21) and further designates a twenty-second block BL21.

The address conversion table is initialized by an address conversion table administrating section (not shown in the drawings) within the flash table controller 28 in parallel with the above initialization of the empty block table. The address conversion table is a table in which a physical address of a block writing data thereto at present corresponds to a logical address in an LBA (logical block address) mode designated by the host computer 14 in writing of these data for each of the flash memories FM0 to FMn. As mentioned above, if data are stored to each block BLj, the logical block address used in the previous writing is stored (saved) to the redundant region of this block BLj as a "conversion table address". Accordingly, it is sufficient to register this logical block address and the physical address of this block BLj to the address conversion table as one set (by collation).

Figure 8A:
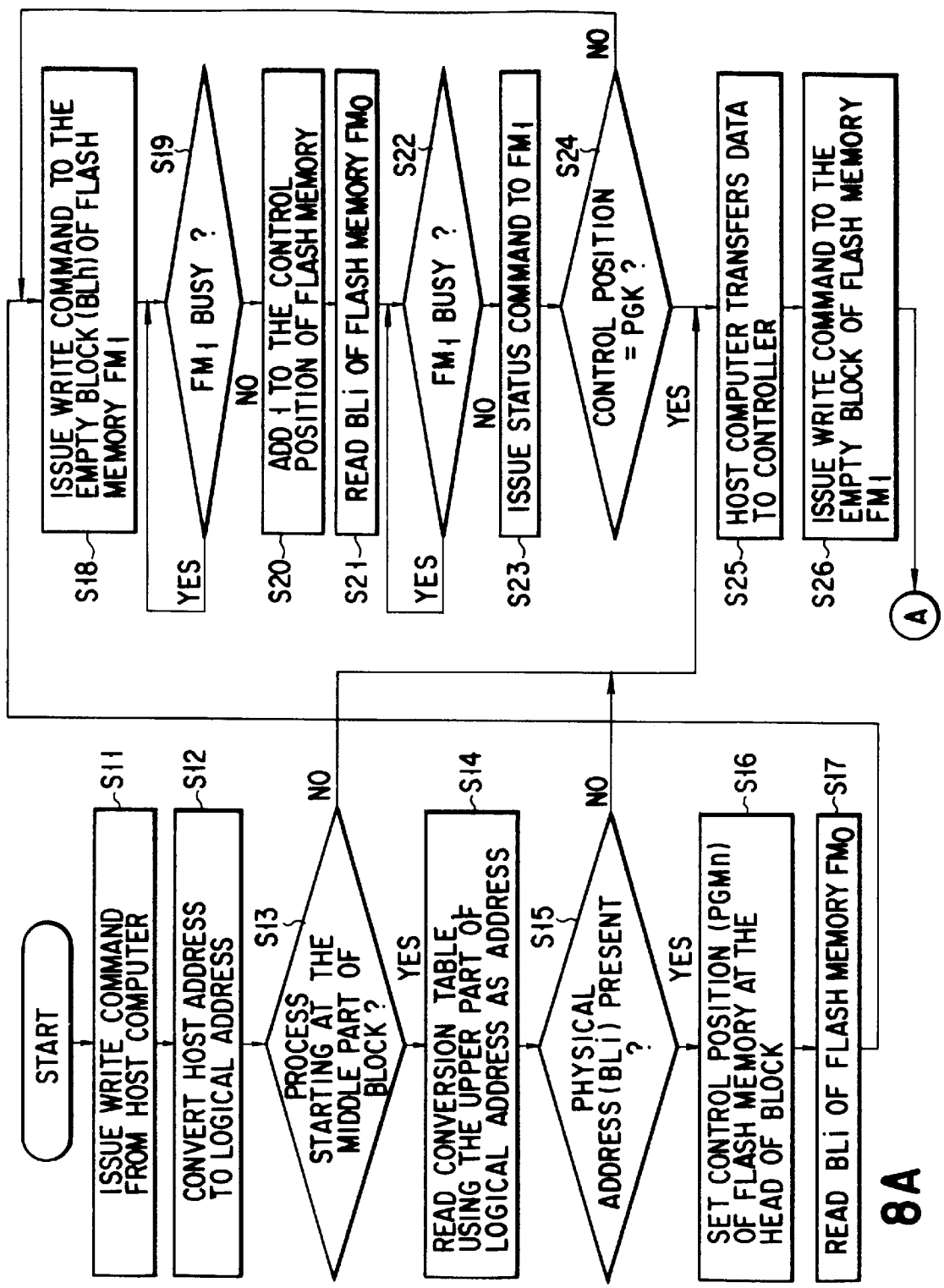
FIGS. 8A and 8B are a flowchart of a process of accessing two chips at the same time in the above embodiment.
Figure 8B:
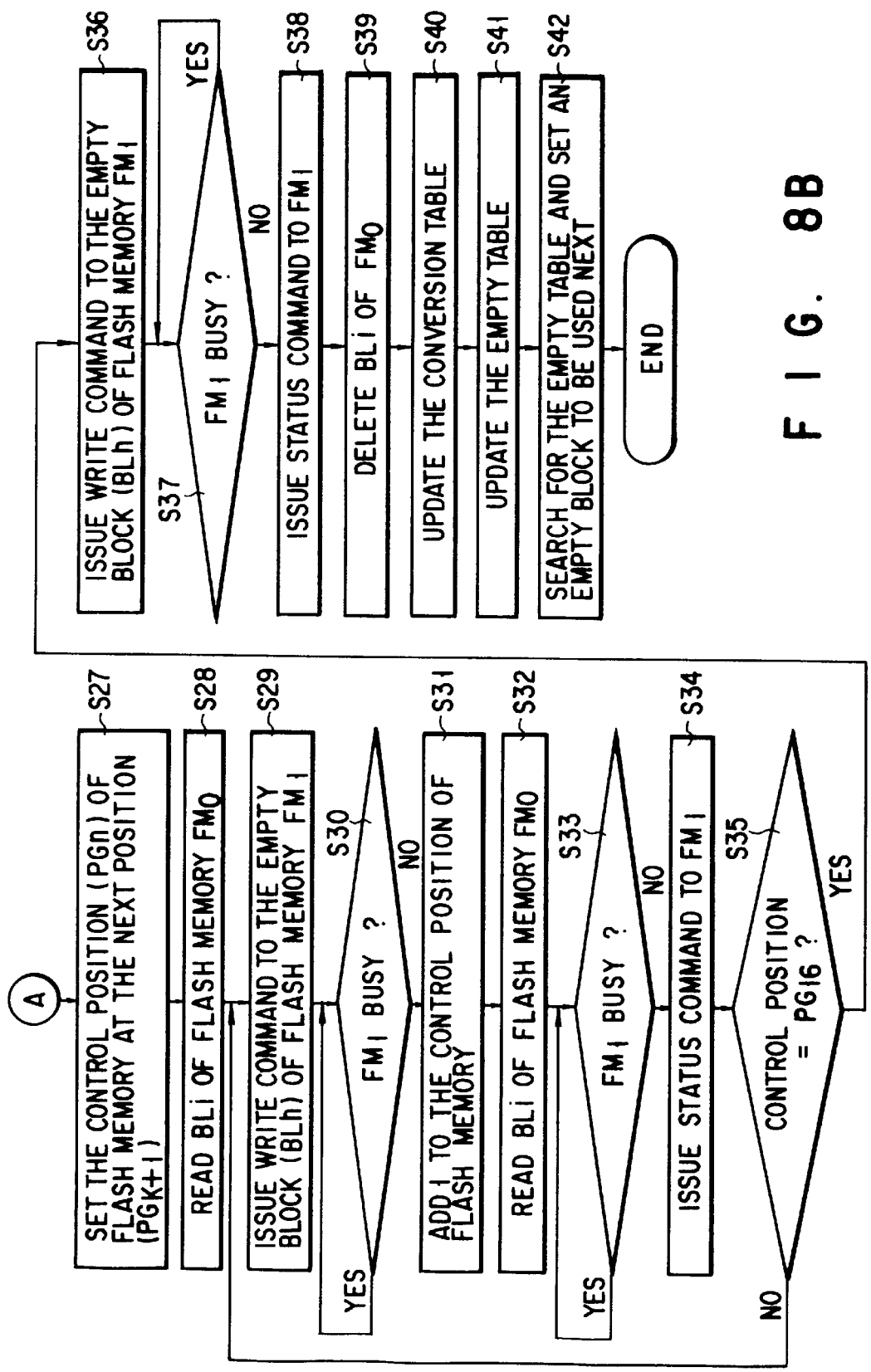

An operation for simultaneously getting access to a chip will next be explained with reference to the flow chart of FIG. 8.

A writing command is first issued from the host computer 14 (S11). Next, an address of the host computer is converted to a logical address (S12). At this time, it is judged (S13) whether the address conversion is started from an intermediate portion of a block. If the address conversion is started from the intermediate portion, a conversion table is read with a high order of the logical address as an address (S13). In contrast to this, if no address conversion is started from the intermediate portion, it proceeds to a processing step S25 for transferring data to the controller by the host computer.

In a step S15, it is judged whether or not there is a physical address BLi in the conversion table read out in the step S14. If this judgment is YES, a control position (PGn) of a flash memory is set to a leading position (PG0) of the block. In contrast to this, if this judgment is NO, it proceeds to the step S25.

After a step S16, the physical address BLi of the flash memory FM0 is read out (S17). Next, a writing command is issued to an empty block (BLh) of the flash memory FMi (S18). At this time, it is judged whether the flash memory FMi is busy (S19). If no flash memory FMi is busy, value 1 is added to a control position of the flash memory (S21).

Next, the block BLi of the flash memory FM0 is read (S21). At this time, it is judged (S22) whether the flash memory FM1 is busy or not. If no flash memory FM1 is busy, a status command is generated in the flash memory FM1 (S23).

In a step S24, it is judged whether the control position is located in position PGk. If this judgment is YES, the host computer 14 transfers data to the controller 10 (S24). In contrast to this, if this judgment is NO, it is returned to the step S18.

After the data transfer in the step S25, a writing command is issued to an empty block of the flash memory FM1 (S26). Thereafter, the control position PGn of the flash memory is set to the next control position PGk+1 (S27) and the block BLi of the flash memory FM0 is read (S28).

Next, the writing command is issued to an empty block (BKh) of the flash memory FM1 (S29). At this time, it is judged whether the flash memory FM1 is busy or not. If no flash memory FM1 is busy, value 1 is added to the control position of the flash memory (S31). Then, the block BLi of the flash memory FM0 is read (S32). At this time, it is judged whether the flash memory FM1 is busy. If no flash memory FM1 is busy, a status command is issued to the flash memory FM1 (S34).

Next, it is judged whether the control position is located in position PG15 (S35). If this judgment is YES, the writing command is issued to an empty block (BLh) of the flash memory FM1 (S36). In contrast to this, if this judgment is NO, it is returned to the step S29.

After the writing command is issued, it is judged (S37) whether the flash memory FM1 is busy or not. If no flash memory FM1 is busy, the status command is issued to the flash memory FM1 (S38). Thereafter, the block BLi of the flash memory FM0 is erased (S39) and the conversion table is updated (S40) and the empty table is also updated (S41). The empty table is then retrieved and an empty table to be next used is set (S42) so that processing is terminated.

Next, an operation performed at a transmitting time of the writing command from the host computer 14 to the controller 10 will be explained with reference to FIGS. 9 to 14.

First, the operations of respective sections within this flash disk system will be explained with reference to FIGS. 9, 11 and 12 when access from the host computer 14 shows new writing.

In FIG. 11, when a writing command (S1) is provided from the host computer 14, an address conversion table is first searched for within the controller 10 (S102). In FIG. 9, when data are written to the flash disk system, the host computer 14 provides a logical address [AD]CHS in a CHS (cylinder head sector) mode to the controller 10. This logical address [AD]CHS from the host computer 14 is converted to a logical address [AD]LBA in an LBA (logical block address) mode by the address converter 24 within the controller 10. This logical address [AD]LBA in this LBA mode is sent to the flash table controller 28 within the controller 10.

The address conversion table administrating section within the flash table controller 28 divides this logical address [AD]LBA into a high order address portion for designating a specific one block BLj, i.e., a logical block address [AD]LBA, BLj and a low order address portion for designating a specific one page PGk, i.e., a logical page address [AD]LBA, PGk. With reference to the address conversion table 29(i), the address conversion table administrating section retrieves whether a physical block address <AD>PH, BLj corresponding to this logical block address [AD]LBA, BLj is registered to the table 29(i) or not.

In this case, since access from the host computer 14 shows new writing, no physical block address <AD>PH, BLj corresponding to the logical address [AD]CHS from the host computer 14, i.e., the logical block address [AD]LBA, BLj is registered to the table 29(i).

When the above retrieved results are transmitted from the address conversion table administrating section, the controller 10 starts processing (S103) for writing data to a desirable flash memory FMi, and simultaneously starts a search (S104) for the empty block table (SRAM (74(i)) within the flash table controller 28 in FIG. 11.

In FIGS. 6 and 9, the pointer <AD>PH, BLh set to the pointer register 80(i) is referred in the search (S103) for the empty block table (SRAM 74(i)) in this case. This pointer shows a physical block address <AD>PH, BLh (015H or A21 in FIG. 6) of an empty block to be used most early.

Since the above logical block address [AD]LBA, BLj is a logical address in the LBA (logical block address) mode, a low order address portion of 4 bits of this logical block address, i.e., a logical page address [AD]LBA, PGk can be also used as a page address of a physical address as it is. Accordingly, a physical address <AD>PH' of 13 bits for designating a page as an object (writing destination) to which data is written at this time is obtained by synthesizing this logical page address [AD]LBA, PGk of 4 bits and the physical block address <AD>PH, BLh of 9 bits.

Here, processing S103 for writing data to the flash memory FMi from the controller 10 will be explained with reference to the timing chart of FIG. 12. Data on 1 page are normally written to the flash memory in one writing cycle TW.

The controller 10 holds a chip enable control signal XFCEi- to be active (low voltage level) for all periods of the writing cycle TW in the flash memory FMi so that the flash memory FMi is held in a chip enable (operable) state.

First, the controller 10 sets a command latch enable control signal FCLE to be active (high voltage level) and sends a data input command CMS of a predetermined code onto buses FD0 to FD7, and simultaneously sets a write enable control signal XFWE- to be active (low voltage level). The data input command CMS on the buses FD0 to FD7 is inputted to the flash memory FMi in response to a command writing operation from this controller 10 and is latched to a command register 50 of the flash memory FMi.

Next, the controller 10 sets an address latch enable control signal FALE to be active (high voltage level) and sends a writing address ADW of a predetermined bit number onto the buses FD0 to FD7 at one time or divisionally sends it at two to three times. The controller 10 sets the write enable control signal XFWE- to be active (low voltage level) in each of the divisional sendings. This writing address ADW corresponds to the physical address <AD>PH' obtained in the retrieval of the above empty block table (SRAM 74(i)).

The writing address ADW on the buses FD0 to FD7 is inputted to the flash memory FMi in response to the address writing operation from this controller 10 and is latched to address buffers 52 and 54 of the flash memory FMi. This writing address ADW designates a page to be written within the flash memory FMi.

Next, the controller 10 sets each of the command latch enable control signal FCLE and the address latch enable control signal FALE to be non-active (low voltage level). In this non-active state, the controller 10 sends writing data DATAW on 1 page (528 bytes) onto the buses FD0 to FD7 every one byte and sets the write enable control signal XFWE- to be active (low voltage level) in each sending of these writing data. The data DATAW on the buses FD0 to FD7 are inputted to the flash memory FMi in response to the write enable control signal XFWE- every 1 byte and are stored to the I/O buffer 46.

Next, the controller 10 again sets the command latch enable control signal FCLE to be active (high voltage level).

The controller then sends a program command CMP of a predetermined code onto the buses FD0 to FD7 and simultaneously sets the write enable control signal XFWE- to be active (low voltage level). The program command CMP on the buses FD0 to FD7 is inputted to the flash memory FMi in response to the command writing operation from this controller 10 and is latched to the command register 50. The flash memory FMi then starts a programming operation.

Namely, the flash memory FMi decodes the program command CMP and writes data on 1 page (528 bytes) stored to the I/O buffer 46 to a memory area (page) within the flash memory array 40 designated by the writing address ADW. For example, a constant time tWB about 300 μs is required to perform the data writing operation within this memory. When this data writing operation is started, the flash memory FMi sets a busy signal XFBSY- to be active (low voltage level) and holds this busy state until the data writing operation is terminated (until the constant time tWB has passed).

When the busy time tWB of the data writing operation has passed in the flash memory FMi, the controller 10 confirms that the busy signal XFBSY- is returned to a non-active state (high voltage level). The controller 10 then checks whether the data writing operation (programming) in the flash memory FMi this time is preferably performed or not.

The controller 10 sets the command latch enable control signal FCLE to be active (high voltage level) to check whether these programming results are good or bad. Further, the controller 10 sends a status register reading command CMC of a predetermined code onto the buses FD0 to FD7 and simultaneously sets the write enable control signal XFWE- to be active (low voltage level).

The status register reading command CMC is inputted from the buses FD0 to FD7 to the flash memory FMi in response to the command writing operation from this controller 10 and is decoded. The flash memory FMi further makes a response to this command CMC. Namely, a writing status bit I/00 set to a status register within the command register 50 within the flash memory FMi is sent onto the buses FD0 to FD7 through the I/O buffer 46.

The controller 10 sets a read (output) enable control signal XFRE- to be active (low voltage level) and receives the writing status bit I/00 from the flash memory FMi. The controller 10 further judges on the basis of contents of this bit whether the data writing operation (programming) in the writing cycle TW this time is successfully performed or not.

The empty block table administrating section within the flash table controller 28 updates the empty block table (SRAM 74(i)) as follows (S105) during the above writing cycle TW in the flash memory FMi.

The control logic 72 loads high order 6 bits AD0 to AD5 of the pointer <AD>PH, BLh held in the pointer register 80 (l) to the address counter 70, and reads empty data [a0 to a7] of 1 word from the empty block table (SRAM 74(i)) by this address data AD0 to AD5. For example, when the pointer designates a memory position 015H(A21) in FIG. 6, address data AD0 to AD5 of the high order 6 bits of this pointer designate a word memory address 02H so that [00000100] is read as empty data [a0 to a7] of 1 word.

This empty data [00000100] of 1 word read from the empty block table (SRAM 74(i)) is inputted to the control logic 72. The control logic 72 then changes, i.e., inverts a value ("1")of the empty data stored to a memory position (a sixth position in this example) within 1 word designated by low order 3 bits AD'0 to AD'2 of the pointer <AD>PH, BLh to an opposite value "0".

Thereafter, the control logic 72 again reads the empty data [a0 to a7] of 1 word from the same memory position 015H(A21) by the same address data AD0 to AD5 loaded to the address counter 70. Thus, since this empty data [a0 to a7] of 1 word is set to [00000000] by the inverting operation of the above empty data, it is confirmed that there is no value "1" in an empty state in this word.

Accordingly, the control logic 72 increments the address data AD0 to AD5 of the address counter 70 by one and retrieves whether or not there is a value "1" in the empty state with respect to the next word memory address 03H. For example, it is assumed that this retrieval is performed until a word memory address 20H.

The empty data [a0 to a7] of 1 word read from this word memory address 20H is set to [01001000]. Therefore, it is detected that there are values "1" in the empty state in this word. Here, the control logic 72 sets an enable control signal ENi- to be active (low voltage level) with respect to the pointer register 80(i).

At this time, binary address data AD'0 to AD'2 outputted from an encoder 78(i) designate a memory position (a second position) at a smallest address showing the value "1" in the empty state within the word memory address 20H. Accordingly, since the enable control signal ENi is set to be active (low voltage level), binary address data AD0 to AD8 of 9 bits are obtained by synthesizing binary address data (high order address) of 6 bits designating the word memory address 20H from the address counter 70 and binary address data AD'0 to AD'2 of 3 bits designating the memory position (second position) having the value "1" in the empty state at the smallest address within the word from the encoder 78(i), and are latched to a pointer register 80(i) as a new pointer <AD>PH, BLh.

Thus, when the block BLj (BL22) in the empty state so far within the flash memory FMi is changed to a block in a using state by new writing, the empty data of the memory position (015H or A21) corresponding to this block BLj (BL22) within the empty block table (SRAM 74(i)) is inverted from value "1" to value "0". Further, the pointer <AD>PH, BLh set to the pointer register 80(i) is changed (updated) to a value showing a memory position (101H or A257) in which value "1" in the empty state is found most early in a position subsequent to a memory position of the inverted empty data. Thus, the empty block table (SRAM area 74(i)) is updated (S105).

After the above writing processing (S103) with respect to the flash memory FMi is terminated, the address conversion table administrating section within the flash table controller 28 updates (S106) the address conversion table 29(i). Namely, in this table update (S6), a logical block address [AD]LBA, BLj designated by the new writing this time and a physical block address (a physical address designating the block BL22 inverted from the empty state to the using state) corresponding to this logical block address are registered to the table 29(i) such that these block addresses correspond to each other.

Next, the operations of respective portions within this flash disk system will be explained with reference to FIGS. 9, 10 and 12 to 14 when a writing command is provided from the host computer 14.

Figure 13:
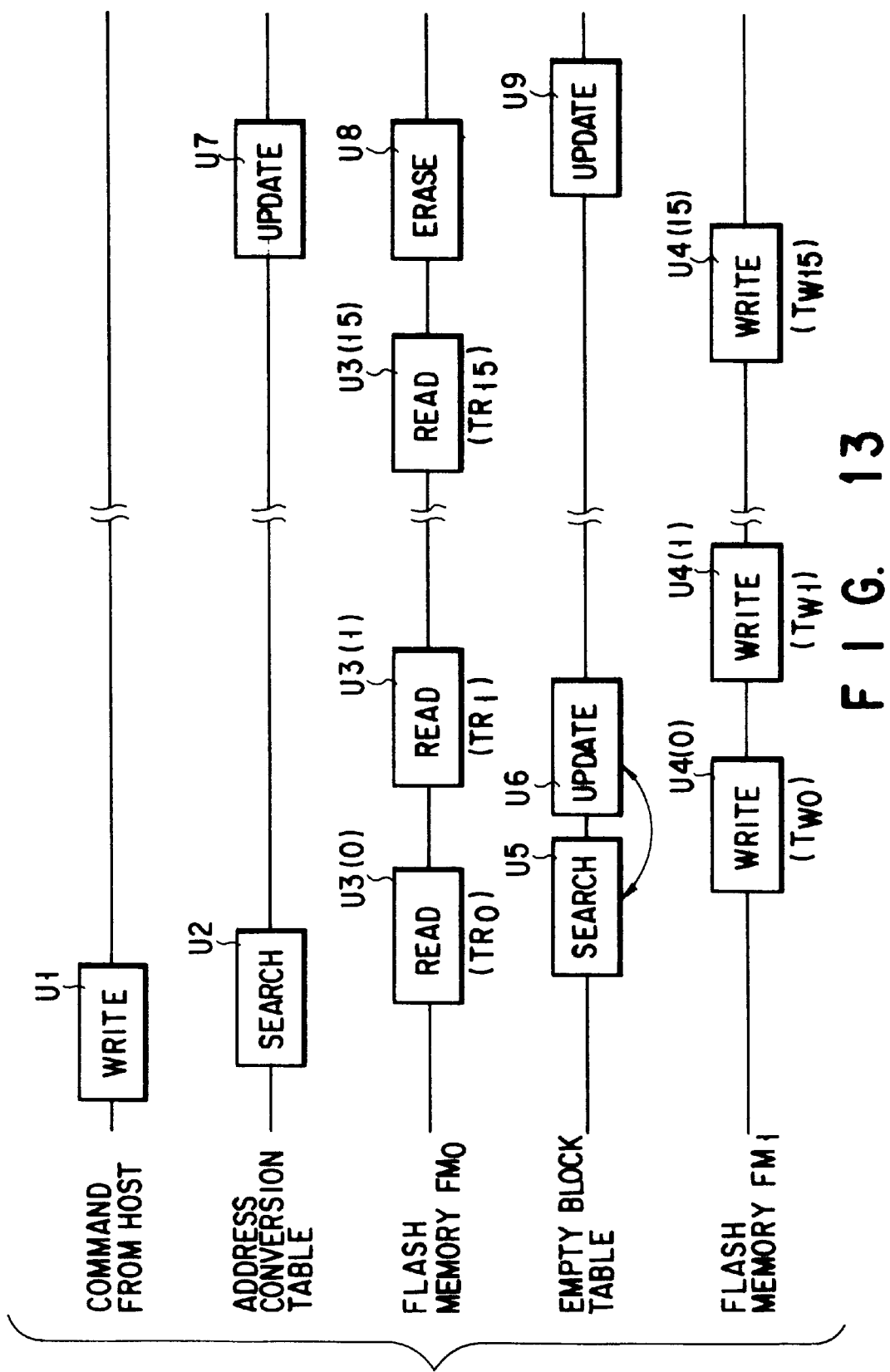
FIG. 13 is a view for explaining a flow of a series of operations of respective portions within the flash disk system with respect to a rewriting access from the host computer in the above embodiment.

In this case, the controller 10 first performs a search (U2) for the address conversion table in response to a writing command (U1) from the host computer 14 in FIG. 13.

In FIG. 9, a writing logical address [AD]CHS in a CHS mode from the host computer 14 is converted to a logical address [AD]LBA in the LBA (logical block address) mode by the address converter 24 within the controller 10. Then, this logical address [AD]LBA in the LBA mode is sent to the flash table controller 28 within the controller 10.

The address conversion table administrating section within the flash table controller 28 refers to the address conversion table 29(i) and retrieves whether a physical block address <AD>PH, BLj corresponding to a high-order address portion of the logical address [AD]LBA, i.e., a logical block address [AD]LBA, BLj is registered to the table 29(i) or not.

In this case, since access from the host computer 14 shows rewriting, the physical block address <AD>PH, BLj corresponding to the logical block address [AD]LBA, BLj is retrieved from the table 29(i). Accordingly, a physical address <AD>PH for designating a page PGk as a data writing object this time is obtained by synthesizing the physical block address <AD>PH, BLj from the address conversion table 29(i) and a low order address portion of the logical block address [AD]LBA, BLj, i.e., a logical page address [AD]LBA, PGk.

However, certain data are written at present to the page PGk within the block BLj designated by this physical address <AD>PH so that no new data can be overwritten onto these certain data of the flash memory by its nature. Accordingly, the new data must be written to a separate empty block. Therefore, all data stored to the other pages (PG0 to PGk−1, PGk+1 to PG15) within this block BLj must be moved to the same empty block as the new data. Normally, an empty block BLh within an adjacent flash memory FMi+1 is set to a moving destination (new block) for rewriting these data.

As shown in FIG. 10, the controller 10 must sequentially read data (except for the page PGk as a rewriting page) every one page from a first page PG0 of the block BLj within the flash memory FMi. Further, the controller 10 must write the read data to respective corresponding pages of the empty block BLh within the flash memory FMi+1. Namely, the controller 10 must perform a data moving operation. With respect to the page PGk as a rewriting object this time, no old data are read from this page PGk of the block BLj within the flash memory FMi, but writing data (new data) from the host computer 14 are written to the page PGk of the empty block BLh within the flash memory FMi+1.

The flash interface 34 has buffers 34A and 34B to move such a series of data and write the new data. The buffer 34A once holds data on 1 page read from the block BLj as a moving (old) source until these data are written to a block BLh as a moving (new) destination. The buffer 34B temporarily holds writing data (new data) sent from the host computer 14 until these writing data are written to the new block BLh.

The controller 10 first executes processing (U3(0)) for reading data DATAPG0 on one page from a first page PG0 of the block BLj of the flash memory FMi to move data as mentioned above.

Here, an operation performed by the controller 10 at a reading time of data from the flash memory FMi will be explained with respect to the timing chart of FIG. 14.

The controller 10 holds a chip enable control signal XFCEi- to be active (low voltage level) for all periods of a reading cycle TR and holds the flash memory FMi in a chip enable (operable) state.

First, the controller 10 sets a command latch enable control signal FCLE to be active (high voltage level). The controller 10 also sends a reading command CMR of a predetermined code onto the buses FD0 to FD7, and simultaneously sets a write enable control signal XFWE- to be active (low voltage level). The reading command CMR is inputted to the flash memory FMi from the buses FD0 to FD7 in response to a command writing operation from this controller 10 and is latched to the command register 50.

Next, the controller 10 sets an address latch enable control signal FALE to be active (high voltage level). The controller 10 then sends a reading address ADR of a predetermined bit number onto the buses FD0 to FD7 one time or divisionally sends it two or three times, and sets a write enable control signal XFWE- to be active (low voltage level) in each of the divisional sendings. This reading address ADR is obtained by adding a page address (a leading page address) within the block to a physical block address <AD>PH, BLj obtained from the address conversion table 29(i).

The reading address ADR on the buses FD0 to FD7 is inputted to the flash memory FMi in response to an address writing operation from this controller 10 and the flash memory FMi starts a data reading operation within this memory.

Namely, the flash memory FMi decodes the inputted reading command CMR and the reading address ADR. The flash memory FMi also reads data DATAR (DATAPG0) on page (528 bytes) from a memory area (page) within the flash memory array 40 designated by the reading address ADR. The flash memory FMi further transfers (sets) the read data DATAR(DATAPG0) to the I/O buffer 46. For example, a constant time tRB about 25 $\mu$s is required to perform the reading operation within this memory. Therefore, the flash memory FMi holds a busy signal XFBSY- to be active (low voltage level) during this processing time tRB.

When the reading operation of the flash memory FMi is terminated and a busy state is released (signal XFBSY- is returned to a high voltage level), the controller 10 begins to input the read data DATAR (DATAPG0) set to the flash memory FMi (7) I/O buffer 46. Namely, the controller 10 sets a read (output) enable control signal XFRE- to be repeatedly (528 times) active (low voltage level) in a constant period. Thus, the read data DATAR (DATAPG0) on 1 page (528 bytes) are inputted from the flash memory FMi(7) I/O buffer 46 to the controller 10 through the buses FD0 to FD7 every 1 byte.

When a first reading cycle TR(0) in the flash memory FMi is terminated as mentioned above, the controller 10 next starts processing (U4(0)) for writing the data DATAPG0 on 1 page read from the flash memory FMi to a first page PG0 of an empty block BLh within a flash memory FMi+1. Simultaneously, the controller 10 starts retrieval (U5) of an empty block table (SRAM 74(i+1)) within the flash table controller 28.

A pointer <AD>PH, BLh set to a pointer register 80(i+1) is referred in the retrieval (U5) of the empty block table (SRAM area 74(i+1)). This pointer designates a physical address <AD>PH, BLh of an empty block to be used most early within the flash memory FMi+1. In the following explanation, this pointer is set to designate a memory position 101H(A257) in FIG. 6.

A writing cycle TWO in the flash memory FMi+1 is also set in a sequence and timing similar to FIG. 12. Accordingly, the data DATAPG0 on 1 page previously read from the flash memory FMi are written to a first page PG0 of the empty block BLh within the flash memory FMi+1 in this writing cycle TWO.

The empty block table administrating section within the flash table controller 28 updates (U6) the empty block table (SRAM 74(i+1)) during the writing cycle TWO in the flash memory FMi+1.

Namely, the block BLh (BL257) within the flash memory FMi+1 in an empty state so far is changed to a block in a using state. Therefore, empty data in a memory position (101H or A257) corresponding to this block BLh (BL257) within the empty block table (SRAM 74($i$+1)) is inverted from value "1" to value "0". Further, the pointer <AD>PH, BLh set to the pointer register 80($i$) is changed (updated) to a value showing a memory position (104H or A260) in which value "1" in the empty state is found most early in a position subsequent to a memory position of the inverted empty data. Processing of update (U6) in this empty block table (SRAM 74($l$+1)) is performed by an operation similar to the processing of update (U5) in the above empty block table (SRAM 74($i$)) with respect to FIG. 11. When the writing cycle TWO in the flash memory FMi+1 is terminated, the controller 10 next executes reading processing (U3(1)) for reading data DATAPG1 on 1 page from a second page PG1 of the block BLj of the flash memory FMi. This reading processing (U3(1)) is also performed in a sequence and timing similar to the above-mentioned first reading processing (U3(0)).

When the reading processing (U3(1)) in the flash memory FMi is terminated, the read data DATAPG1 on 1 page are next written (U4(1)) to the second page PG1 of the empty block BLh within the flash memory FMi+1. This writing processing (U4(1)) is also performed in a sequence and timing similar to the above-mentioned first writing processing (U4(1)).

With respect to subsequent pages PG2, PG3, - - -, similar to the above case, data DATAPG2, DATAPG3, - - - on 1 page are sequentially moved to corresponding pages PG of the empty block BLh within the flash memory FMi+1 from each page PG of the block BLj within the flash memory FMi.

However, no processing (U3(k)) for reading data DATAPGk from a (k+1)-th page PGk as a rewriting object within the block BLj is performed in the flash memory FMi. This is because new data DATAPGk' from the host computer 14 replaced with these old data DATAPGk are prepared in the buffer 34B within the controller 10. In (k+1)-th writing processing (U4(k)) in the flash memory FMi+1, new data DATAPGk' set to the buffer 34B are written to (k+1)-th page PGk of the empty block BLh.

When the final writing processing (U4(15)) is terminated in the flash memory FMi+1, a data moving operation for moving data from the block BLj within the flash memory FMi to the empty block BLh within the flash memory FMi+1 by data-rewriting this time is completed.

Next, the controller 10 updates (U7) address conversion tables 29($i$) and 29($i$+1) within the flash table controller 28. Further, the controller 10 executes batch erasure of all data DATAPG0 to DATAPG15 stored to the block BLj of the flash memory FMi.

In the update of the address conversion table 29($i$), the logical block address [AD]LBA, BLj designated in the writing this time and a physical block address (a physical address designating the block BLj) corresponding to this logical block address are deleted from the table 29($i$). In contrast to this, in the update of the address conversion table 29($i$+1), the logical block address [AD]LBA, BLj designated in the writing this time and a physical block address (a physical address designating the block BLh) newly corresponding to this logical block address are registered to the table 29($i$+1).

In the batch erasure in the block BLj of the flash memory FMi, for example, an erasing executing command CMEC and addresses for designating an erasing setup command CMES and the block BLj are sequentially provided by the controller 10 to the flash memory FMi in predetermined timing. A erasing operation of the block is executed with respect to the block BLj within the flash memory FMi in response to this provision.

When the block erasing operation is terminated in the flash memory FMi, the controller 10 reads predetermined status information within the flash memory FMi, which is similar to good and bad checking immediately after the writing (programming). It is checked on the basis of this read status information whether the block erasing with respect to the block BLj this time is successfully performed or not.

In the above checking, it is confirmed that the block BLj within the flash memory FMi correctly attains an empty state. Next, the controller 10 updates (U9) the empty block table (SRAM 74($i$)) within the flash table controller 28.

Namely, the block BLj in a using state so far within the flash memory FMi is changed to an empty block by the rewriting this time. Therefore, empty data in a memory position corresponding to this block BLj within the empty block table (SRAM 74($i$)) is inverted from value "0" to value "1".

Thus, a series of operations within this flash memory system with respect to rewriting access from the host computer 14 has been terminated.

As mentioned above, in the flash memory system in this embodiment, the empty block table in each flash memory FMi is constructed in a memory area of a bit number (512 bits) equal to the total number (512) of blocks BL0 to BL511 within the flash memory FMi. This required memory capacity (512 bits) is 1/9 in comparison with a required memory capacity (512×9 bits) in the conventional empty block table.

In the flash memory system in this embodiment, the SRAM 74($i$) for forming this empty block table may be composed of a small capacity memory constructed by 64 words×8 bits. For example, when 10 flash memories FM0 to FM9 are connected, it is sufficient to set the memory capacity of all empty block tables (SRAM areas 74(0) to 74(10)) to 5120 bits so that these tables can be naturally built in the controller 10 of one chip. Thus, a processing speed of the controller 10 is improved and this flash memory system or card 12 can be greatly made compact.

The construction of the flash disk system in the above embodiment, especially, each of the internal constructions of the flash memories and the controller is one example. The present invention can be applied to an arbitrary memory system in which plural flash memories are connected to one controller or CPU through a common bus. The present invention can be also applied to another semiconductor memory for performing a reading operation equal to that of each of the flash memories.

As explained above, the memory system of the present invention has plural memory positions one-to-one corresponding to plural blocks within a semiconductor memory. An empty block within the semiconductor memory is managed by a table memory storing empty data in each of the memory positions as to whether or not one block corresponding to each of the memory positions is in an empty state in which no data are included in this block. Accordingly, the table memory can be greatly made compact or can be reduced in scale so that performance of the memory system can be improved and the memory system can be made compact.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A memory apparatus comprising:

a semiconductor memory having a memory area divided in a plurality of blocks for selectively storing data and batch-erasing data in units of a block; and a control section connected to a host computer for controlling a read/write operation in accordance with a command therefrom and having a table memory which has a plurality of memory positions in one-to-one correspondence with the blocks of the semiconductor memory, and stores data indicating absence of data in a memory position thereof which corresponds to one of the blocks in which no data is stored, wherein the control section includes means for designating the memory positions of the table memory by means of addresses allocated to the blocks of the semiconductor memory, respectively, and the control section includes table search means for searching for "empty state"-indicative data stored in the memory positions of the table memory in a predetermined sequence and stopping a search operation in response to a first detection of the memory position corresponding to one of the blocks which is in an empty state, and pointer means for issuing address data for designating the one of the blocks which has been detected by the table searching means and is in the empty state.

2. The memory apparatus according to claim 1, wherein the control section includes first table update means for updating "empty state"-indicative data stored in one of the memory positions of the table memory which corresponds to the one of the blocks which is in an empty state and is designated by the address data from the pointer means, to "empty-state"-indicative data when new data is written in said one of the blocks.

3. The memory apparatus according to claim 1, wherein the control section includes second update means for updating data stored in one of the memory positions of the table memory which corresponds to one of the blocks of the semiconductor memory which is subjected to a batch erasing to "empty state"-indicative data, when any one of the blocks is batch-erased.

4. A memory apparatus according to claim 1, wherein said control section includes means for converting a logical address from the host computer into a physical address for the semiconductor memory.

5. A memory apparatus comprising:

a plurality of semiconductor memories each having a memory area divided into a plurality of blocks for selectively storing data and batch-erasing data in units of a block;

an empty block table administrating section having an address counter common to the semiconductor memories, a control logic circuit, a SRAM having parallel memory regions corresponding to the semiconductor memories, respectively, a plurality of empty registers, an encoder and a plurality of pointer registers, and wherein each of the memory regions of the SRAM has an empty block table for registering at least one empty block of each of the semiconductor memories, and writes "empty state"-indicative data in the table when it receives write-in address data from the address counter, a writing control signal from the control logic circuit and "empty state"-indicative data from the data register.

6. The memory apparatus according to claim 5, wherein the "empty-state"-indicative data is read out from the table of each of the memory regions of the SRAM in response to the readout address data from the address counter and the readout control signal from the control logic circuit, and the encoders encode the "empty state"-indicative data read out from the memory regions of the SRAM at the same time into binary address codes, and the pointer registers each produce address data by synthesizing the address data from the address counter and a corresponding one of the binary address codes from the encoders.

7. The memory apparatus according to claim 6, wherein the control logic circuit loads high-order address data of a pointer which is held by each of the pointer registers in the address counter, reads out "empty state"-indicative data of one word from the empty block table by means of the address data, and updates the "empty state"-indicative data stored in a memory position within one word designated by low-order address data of the "empty state"-indicative data of the readout one word, to "non-empty state indicative data.

8. A memory apparatus according to claim 5, wherein said SRAM includes an address conversion table in which a logical address from a host computer corresponds to a physical address for the semiconductor memory.

9. A memory control method comprising the steps of:

preparing a semiconductor memory device connected to a host computer and executing a read/write operation in accordance with a command from the host computer;

providing a plurality of memory positions in a table memory, the memory positions corresponding to a plurality of blocks obtained by dividing a memory area of the semiconductor memory device, wherein data is selectively stored in said blocks and batch-erased from said blockselectively storing data and batch-erasing data in units of a block;

storing "empty state"-indicative data indicating absence of data in at least one of the memory positions of the table memory which corresponds to at least one of the blocks which contains no data; and detecting at least one empty block by searching the table memory for the "empty state"-indicative data in a data writing mode.

10. The method according to claim 9, which includes designating the memory positions of the table memory by means of the addresses allocated to the blocks, respectively.

11. The method according to claim 9, wherein includes searching for "empty state"-indicative data stored in the memory positions of the table memory in a predetermined sequence, stopping searching of the "empty state"-indicative data in response to a first detection of one of the memory positions corresponding to one of -the blocks which is in an empty state in the semiconductor memory device, and generating address data for designating the detected one of the block which is in an empty state.

12. The method according to claim 11, which includes updating the "empty state"-indicative data stored in the memory position of the table memory which corresponds to one of the blocks which is designated by the address data and in which new data is written, to "non-empty state"-indicative data.

13. The method according to claim 11, which includes updating the "non-empty state"-indicative data stored in one of the memory positions of the table memory which corresponds to one of the blocks of the semiconductor memory which has been subjected to a batch erasure, to "empty state"-indicative data.

14. A memory control method according to claim 9, which includes a step of converting a logical address from the host computer into a physical address for the semiconductor memory device.

* * * * *